United States Patent [19]

Osakabe et al.

[11] Patent Number: 4,998,237
[45] Date of Patent: Mar. 5, 1991

[54] OPTICAL DISC RECORDING DEVICE HAVING IMPROVED ACCURACY OF PIT FORMATION

[75] Inventors: Katsuichi Osakabe; Yoshiaki Suzuki, both of Hamamatsu, Japan

[73] Assignee: Yamaha Corporation, Hamamatsu, Japan

[21] Appl. No.: 185,701

[22] Filed: Apr. 25, 1988

[30] Foreign Application Priority Data

Apr. 28, 1987 [JP] Japan .................. 62-105247
Jun. 1, 1987 [JP] Japan .................. 62-137915

[51] Int. Cl.$^5$ ............................................... G11B 7/00
[52] U.S. Cl. .................... 369/109; 369/116; 369/59
[58] Field of Search ........... 369/100, 109, 111, 116, 369/133, 121, 48–52, 59

[56] References Cited

U.S. PATENT DOCUMENTS 4,873,680 10/1989 Chung et al. ............... 369/116 X

FOREIGN PATENT DOCUMENTS

56-3438  1/1981  Japan .................. 369/109
56-3441  1/1981  Japan .................. 369/109
59-22239 2/1984  Japan .................. 369/109
61-37225 6/1986  Japan .................. 369/121

Primary Examiner—Aristotelis M. Psitos
Attorney, Agent, or Firm—Spensley Horn Jubas & Lubitz

[57] ABSTRACT

An optical disc recording device comprises laser beam control means or a mark length recording type which records data by forming pits on an optical disc by radiation of laser beam for periods of time corresponding to pit lengths of respective pits. The laser beam control means shortens radiation time of laser beam as pit length of a pit to be formed increases. The laser beam control means also shortens radiation time of laser beam as immediately preceding blank length of a pit to be formed decreases. The shortening of the radiation time cancels tendency to increasing of pit length whereby a pit of pit length which is close to a set value can be formed. In one aspect of the invention, the laser beam control means advances starting of radiation of laser beam as immediately preceding blank length of a pit to be formed increases. The advancing of starting of radiation of laser beam enables adjusting of a pit starting and position to a predetermined position whereby blank length which is close to a set value can be obtained.

4 Claims, 6 Drawing Sheets

OPTICAL DISC RECORDING DEVICE HAVING IMPROVED ACCURACY OF PIT FORMATION

BACKGROUND OF THE INVENTION

This invention relates to an optical disc recording device of a mark length recording type which records data by forming pits on a disc with laser beam. The optical disc recording device is capable of reducing jitter occurring in a reproduced signal by reducing error in pit length (length of a pit in the advancing direction of a beam spot) or blank length (length of a blank portion of the disc between adjacent pits in the advancing direction of the beam spot) thereby improving the quality of the reproduced signal owing to improvement of signal-to-noise ratio.

For recording data on a master disc of a Compact Disc (CD) or a video disc or a DRAW disc which can be used as a document filing disc memory by writing data thereon, a disc on which recording film made of tellurium or bismuth is uniformly coated is rotated at a constant revolution velocity or constant linear velocity and pits are formed by melting the recording film with laser beam. This recording has generally been performed by irradiating laser beam for a period of time corresponding to length of a pit to be formed (e.g., 231 nsec for 1T in a Compact Disc) as shown in (a) in FIG. 2 or by irradiating laser beam for a period of time corresponding to length of a pit to be formed minus a predetermined length of time t0 as shown in (b) of FIG. 2.

Pit length or blank length can be set at various values depending upon consecutive times of occurrence of "1" or "0" of data to be recorded (e.g., 3T to 11T in a Compact Disc format). Since time length during which laser beam is irradiated increases with increase in the pit length, degree of heating of the recording film increases with increase in the pit length with a result that the recording film tends to be melted more quickly as the pit length increases. This phenomenon becomes more remarkable as heat conductivity of the recording film becomes larger relative to the linear velocity of the rotating disc.

Figure 2:
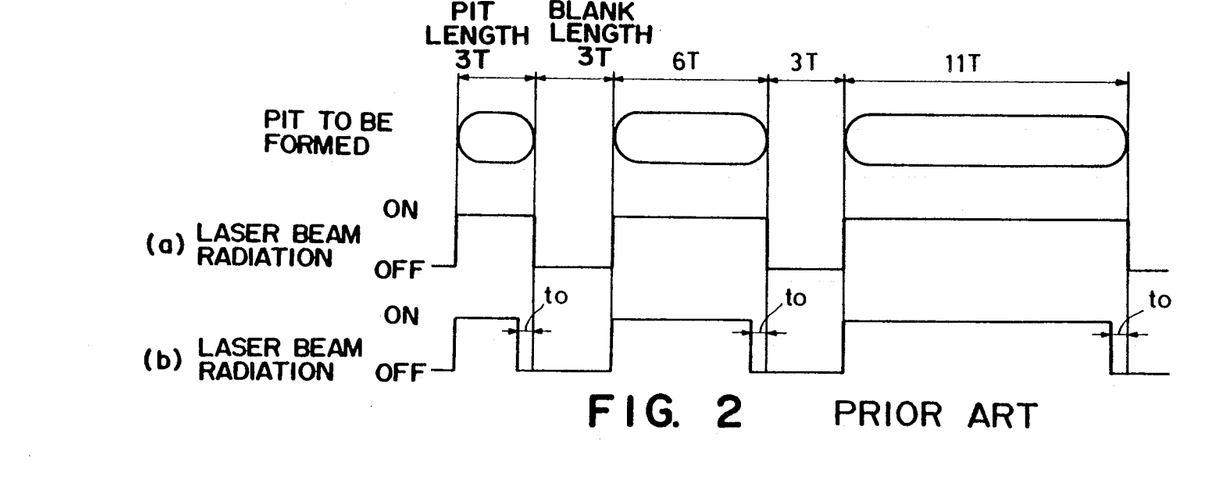
FIG. 2, consisting of (a) and (b), is a diagram showing an example of recording laser beam used in the prior art recording device.
Figure 3:
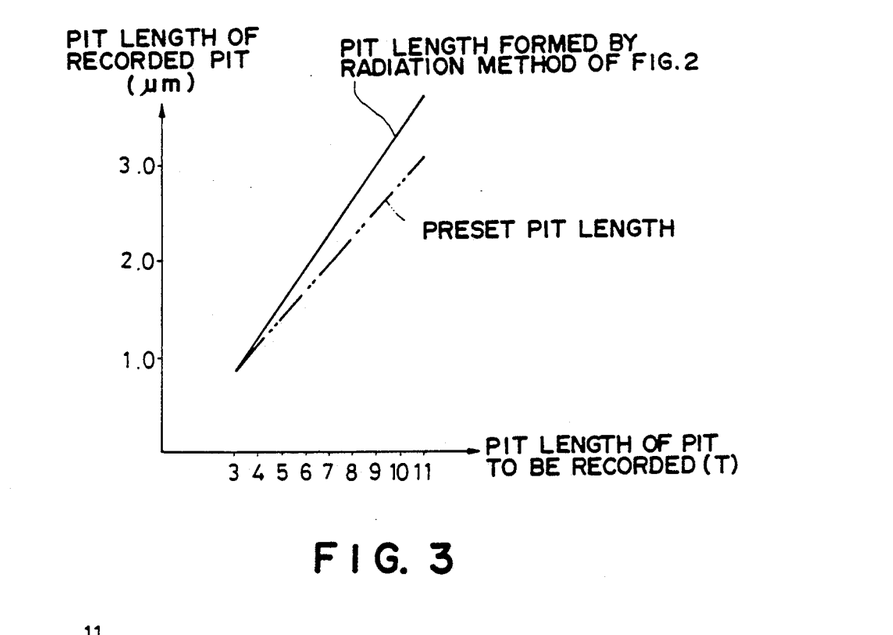
FIG. 3 is a diagram showing pit length of a pit formed with the laser beam of FIG. 2.
Figure 4:
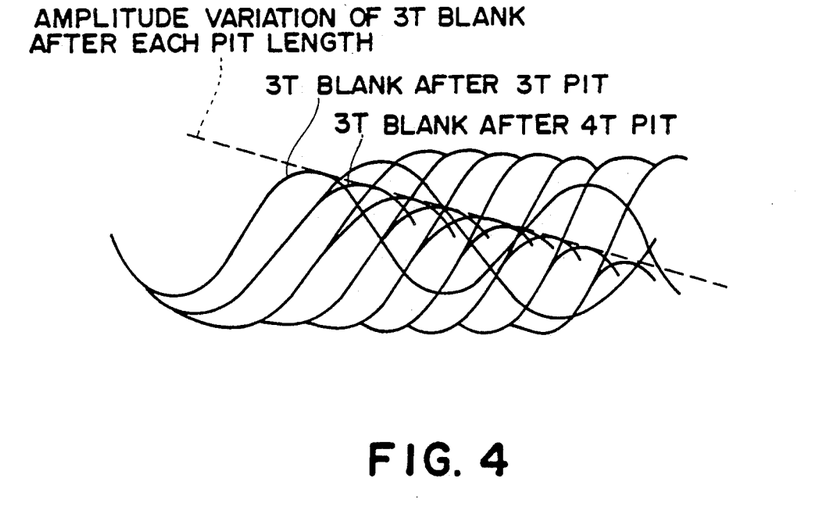
FIG. 4 is a diagram showing eye patterns of signals reproduced from pits formed with the laser beam of FIG. 2.

For this reason, in prior art recording devices in which laser beam is irradiated for a period of time corresponding to the pit length regardless of magnitude of the pit length as shown in (a) or (b) in FIG. 2, the pit length of a pit which is actually formed becomes increasingly larger than a preset value as the pit length increases as shown in FIG. 3 (on condition that the length of blank immediately before the pit remains the same) even if power of laser beam is adjusted so as to obtain a preset pit length at, e.g., a pit of 3T. As viewed in eye patterns of reproduced signal waveforms shown in FIG. 4, eye patterns of reproduced signal waveforms in which blanks of 3T are formed respectively immediately after pits of 3T to 11T show that amplitude of the blank of 3T decreases as the pit length increases. This indicates that the actual pit length becomes increasingly larger than a preset value as the pit length increases. This causes jitter in a reproduced signal with resulting occurrence of errors and deterioration in the signal-to-noise ratio in the reproduced signal.

The length of a pit varies also depending upon the length of a blank immediately before the pit (hereinafter referred to as "immediately preceding blank length"). As immediately preceding blank length decreases, degree of influence of heating made in forming an immediately preceding pit on forming a next pit increases with a result that the recording film is melted more quickly in forming the next pit. Accordingly, even if radiation time of laser beam is the same, pit length of an actually formed pit increases as the immediately preceding blank length decreases.

Figure 10:
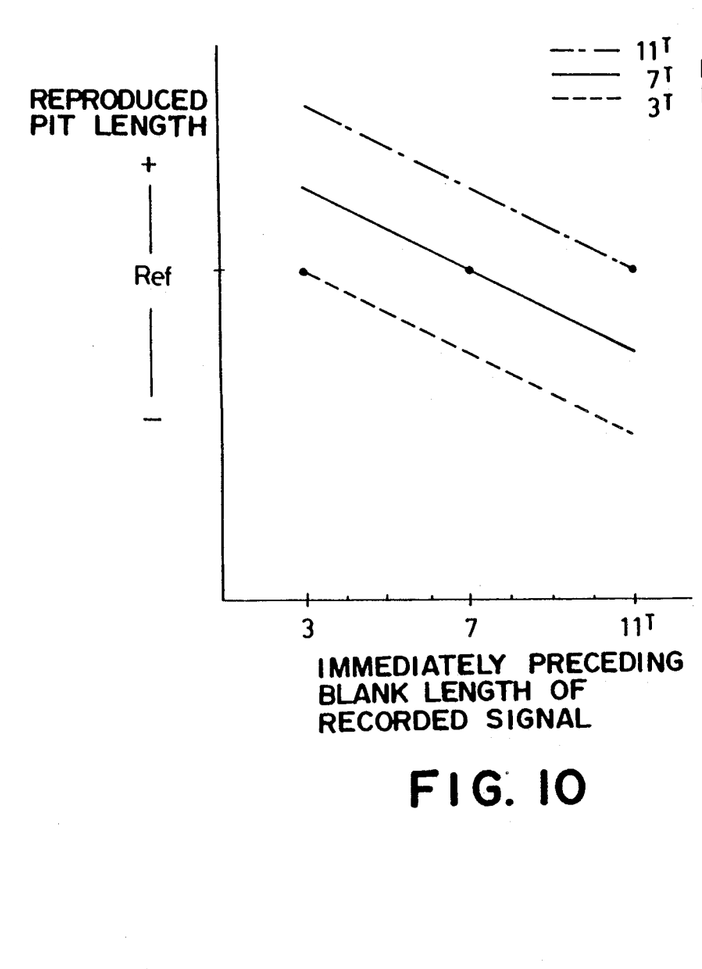
FIG. 10 is a diagram showing deviation of a pit length when radiation time has not been corrected in accordance with immediately preceding blank length.

FIG. 10 shows an example of variation of pit length of an actually formed pit depending upon immediately preceding blank length with respect to pits of 3T, 7T and 11T. In this figure, combination of pit length and blank length of the same time length is taken as reference Ref for each pit length and deviation from the reference Ref for each pit length is plotted. As will be apparent from the figure, as immediately preceding blank length decreases, the recording film is melted more quickly due to influence of heating made in forming a preceding pit so that the pit length increases despite the same radiation time of laser beam. This causes jitter in a reproduced signal with resulting occurrence of errors and deterioration in the signal-to-noise ratio in the reproduced signal.

The variation in immediately preceding blank length causes variation not only in pit length but also in relationship between a radiation start position and a pit starting end position of a pit formed by the radiation. That is, as immediately preceding blank length increases, distance between the radiation start position and the pit starting end position increases. This is because influence of heat from an immediately preceding pit decreases as the immediately preceding blank length increases with a result that it becomes harder to melt the recording film.

For this reason, if it is assumed that radiation is started at a predetermined radiation start position irrespectively of immediately preceding blank length, the pit starting end position is increasingly deviated behind as the immediately preceding blank length increases so that a correct blank length cannot be obtained. Since pit length and blank length have the same data weight for recorded data, this also causes jitter in a reproduced signal.

It is, therefore, an object of the invention to reduce errors in pit length and blank length and thereby decrease jitter in a reproduced signal for reducing errors and improving the signal-to-noise ratio in the reproduced signal.

SUMMARY OF THE INVENTION

For achieving the above described object of the invention, it is a feature of the optical disc recording device according to the invention to shorten laser beam radiation time when a pit of a larger pit length is to be formed.

The optical disc recording device according to the invention is characterized in that it comprises laser beam control means of a mark length recording type which records data by forming pits on an optical disc by radiation of laser beam for periods of time corresponding to pit lengths of respective pits, said laser beam control means shortening radiation time of laser beam as pit length of a pit to be formed increases.

Since, as described before, a pit formed on the recording film tends to become longer relative to radiation time as the pit length increases, shortening of the radiation time cancels the tendency to increasing of the pit length whereby a pit of pit length which is closer to a set value can be formed. Accordingly, jitter in a reproduced signal can be reduced whereby a reproduced signal in which error is reduced and the signal-to-noise ratio is improved can be obtained.

It is another feature of the optical disc recording device achieving the above described object of the invention to shorten radiation time of laser beam when a pit of a smaller immediately preceding blank length is to be formed.

The optical disc recording device having this feature is characterized in that it comprises laser beam control means of a mark length recording type which records data by forming pits on an optical disc by radiation of laser beam for periods of time corresponding to pit lengths of respective pits, said laser beam control means shortening radiation time of laser beam as immediately preceding blank length of a pit to be formed decreases.

Since, as described above, a pit formed tends to become longer relative to the radiation time as the immediately preceding blank length decreases, shortening of the radiation time cancels the tendency to increasing of pit length whereby a pit of pit length which is closer to a set value can be formed. This contributes to reduction of jitter in a reproduced signal with resulting reduction in error and improvement in the signal-to-noise ratio in the reproduced signal.

It is another feature of the optical disc recording device achieving the above described object of the invention to advance starting of radiation of laser beam when an immediately preceding blank length of a pit to be formed increases.

In one aspect of the invention, the optical disc recording device is characterized in that it comprises laser beam control means of a mark length recording type which records data by forming pits on an optical disc by radiation of laser beam for periods of time corresponding to pit lengths of respective pits, said laser beam control means advancing starting of radiation of laser beam as immediately preceding blank length of a pit to be formed increases.

Since, as described before, the pit starting end position tends to be increasingly deviated behind relative to the radiation start position as immediately preceding blank length increases, advancing of starting of radiation of laser beam in forming a pit after a larger immediately preceding blank length enables adjusting of the pit starting end position to a predetermined position whereby blank length which is closer to a set value can be obtained and jitter in a reproduced signal can further be reduced.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 5:
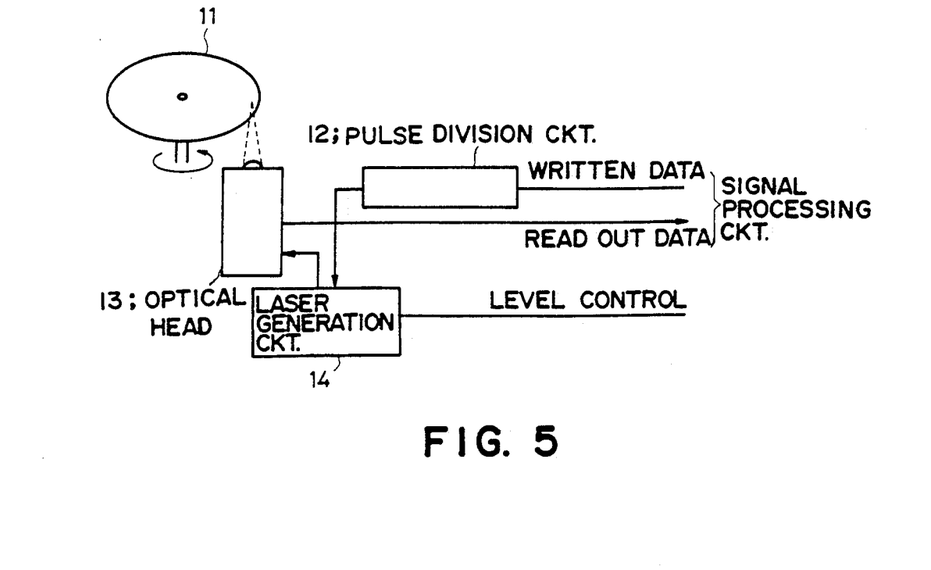
FIG. 5 is a block diagram showing a portion of a DRAW disc recording device made according to the invention including an optical head and its peripheral circuits.

FIG. 5 which shows a portion of a DRAW disc recording device embodying the invention including an optical head and its peripheral circuits. The entire structure of the recording device can be constructed, for example, of a structure shown in the same applicant's copending Japanese Patent Application No. 307372/1986. A DRAW disc 11 is made of a substrate of glass, synthetic resin or other material and a metal layer of a suitable metal such as tellurium coated on the substrate. A plurality of tracks of pregroove are spirally preformed on this disc 11. When data is recorded, data and address are written by tracking these tracks at a predetermined constant linear velocity. During reproduction, recorded address is read and recorded data is read out from the desired address. Recording of data on the disc 11 is made by melting the metal layer of the disc 11 with recording laser beam for forming pits. Reproduction of data is made by detecting the pits by reflection of reproducing laser beam.

An optical head 13 effects recording or reproduction of data by irradiating recording or reproducing laser beam generated by a laser beam generation circuit 14 on the surface of the disc 11 which is rotated at a constant linear velocity. Level of laser beam is controlled by a level control signal so that the level is larger during recording than during reproduction. During recording, laser beam generated by the laser beam generation circuit 14 is irradiated on the surface of the disc 11 after data to be written is modulated into plurally divided pulses by a pulse division circuit 12. Radiation time of this recording laser beam is controlled in accordance with pit length and immediately preceding blank length of a pit to be formed and pit length of a substantially predetermined value can be obtained regardless of magnitudes of pit length and blank length.

Description will now be made in detail about the control of radiation time of recording laser beam by the pulse division circuit 12 and the laser beam generation circuit 14.

The pulse division circuit 12 and the laser beam generation circuit 14 irradiate laser beam for a period of time corresponding to pit length of a pit to be formed. These circuits also correct the radiation time and timing of start of radiation of laser beam in accordance with pit length and immediately preceding blank length of the pit to be formed so that a substantially predetermined pit length can be formed at a substantially predetermined position. The correction of the radiation time and the timing of start of radiation will be described more fully below.

Figure 1:
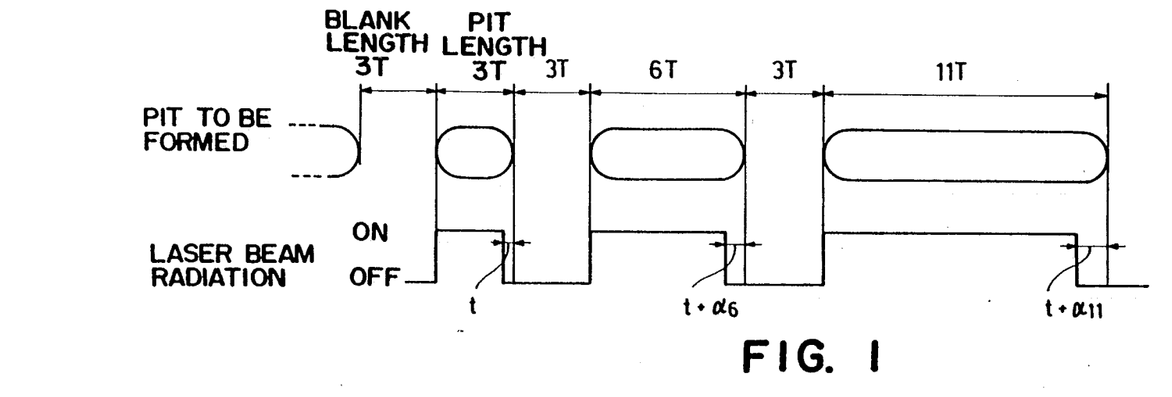
FIG. 1 is a diagram showing an example of recording laser beam which has been corrected in radiation time in accordance with pit length of a pit to be formed.

(1) Correction of radiation time in accordance with pit length of a pit to be formed Since, as described before, a pit formed on the recording film tends to become longer relative to radiation time as the pit length increases, radiation time is shortened as the pit length increases as shown in FIG. 1 thereby cancelling the tendency to increasing of the pit length.

An example of radiation time for various pit lengths when immediately preceding blank length is made constant is shown in the following Table 1:

TABLE 1

Figure 6:
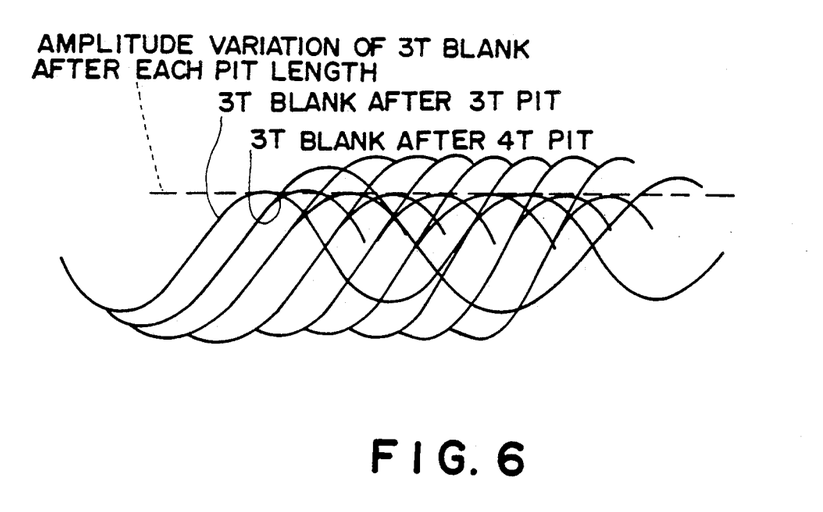
FIG. 6 is a diagram showing eye patterns of signals reproduced from pits formed with the laser beam of FIG. 1.
Figure 7:
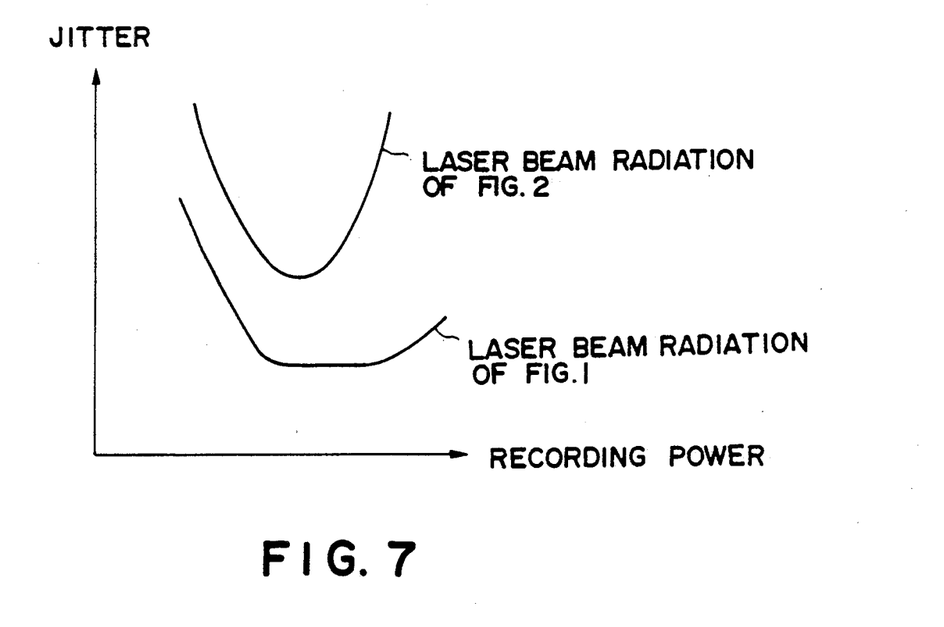
FIG. 7 is a diagram showing relative ratio of jitter to recording power of a signal reproduced from the pit formed with the laser beam of FIG. 1.
Figure 8:
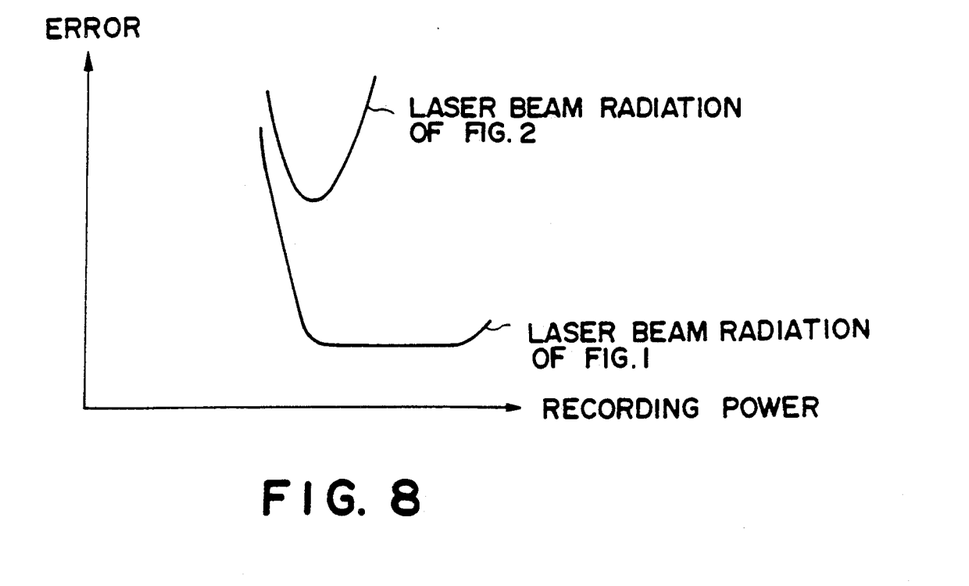
FIG. 8 is a diagram showing relative ratio of errors to recording power of a signal reproduced from the pit formed with the laser beam of FIG. 1.

| Pit length of a pit to be formed | Radiation time |
|---|---|
| 3T | $3 \cdot T0 - t$ |
| 4T | $4 \cdot T0 - (t + \alpha_4)$ |
| 5T | $5 \cdot T0 - (t + \alpha_5)$ |
| . | . |
| . | . |
| . | . |
| 11T | $11 \cdot T0 - (t + \alpha_{11})$ | where
T0 = 1/4.3218 MHz
t = 0 to 500 nsec
$\alpha_n$ = 0 to 100 nsec
(n = 4, 5, ...., 11)
$\alpha_4 < \alpha_5 < ........ < \alpha_{11}$ By obtaining optimum values of t and $\alpha_n$ in Table 1 by experiments, a pit of pit length which is close to a predetermined value can be formed regardless of the magnitude of the pit length. In this case, as shown in the eye patterns of FIG. 6, the amplitude of 3T blank after pits of pit lengths ranging from 3T to 11T is substantially constant. As a result, relative ratio of jitter with respect to recording power is reduced as compared with the prior art radiation method as shown in FIG. 7. Accordingly, relative ratio of errors with respect to recording power is also reduced as compared with the prior art radiation method as shown in FIG. 8.

(2) Correction of radiation time in accordance with immediately preceding blank length Since, as described before, pit length of a pit formed tends to become longer relative to radiation time as immediately preceding blank length decreases, radiation time is shortened as immediately preceding blank length decreases thereby cancelling the tendency to increasing of the pit length.

An example of radiation time for various immediately preceding blank lengths when pit length NT (N being 3, 4, .... 11) of a pit to be formed is made constant is shown in the following Table 2:

TABLE 2

| Immediately preceding blank length | Radiation time for forming a pit of pit length NT |
|---|---|
| 3T | $N \cdot T0 - (t + \beta_{3,N})$ |
| 4T | $N \cdot T0 - (t + \beta_{4,N})$ |
| 5T | $N \cdot T0 - (t + \beta_{5,N})$ |
| . | . |
| . | . |

TABLE 2-continued

| Immediately preceding blank length | Radiation time for forming a pit of pit length NT |
|---|---|
| . | . |
| 11T | $N \cdot T0 - (t + \beta_{11,N})$ | where
T0 = 1/4.3218 MHz
t = 0 to 500 nsec
$\ominus_{3,N} > \ominus_{4,N} > \ominus_{5,N} > ..... \ominus_{1,N}$ By obtaining optimum values of t and $\ominus_{n,N}$ of Table 2 by experiments, a pit of pit length which is close to a predetermined value can be formed regardless of magnitude of immediately preceding blank length. As a result, jitter in the reproduced signal is reduced so that occurrence of errors is reduced and the signal-to-noise ratio is improved in the reproduced signal.

(3) Correction of timing of start of radiation in accordance with immediately preceding blank length As described before, the pit starting end position tends to be increasingly deviated behind relative to the radiation start position as immediately preceding blank length increases.

Figure 9:
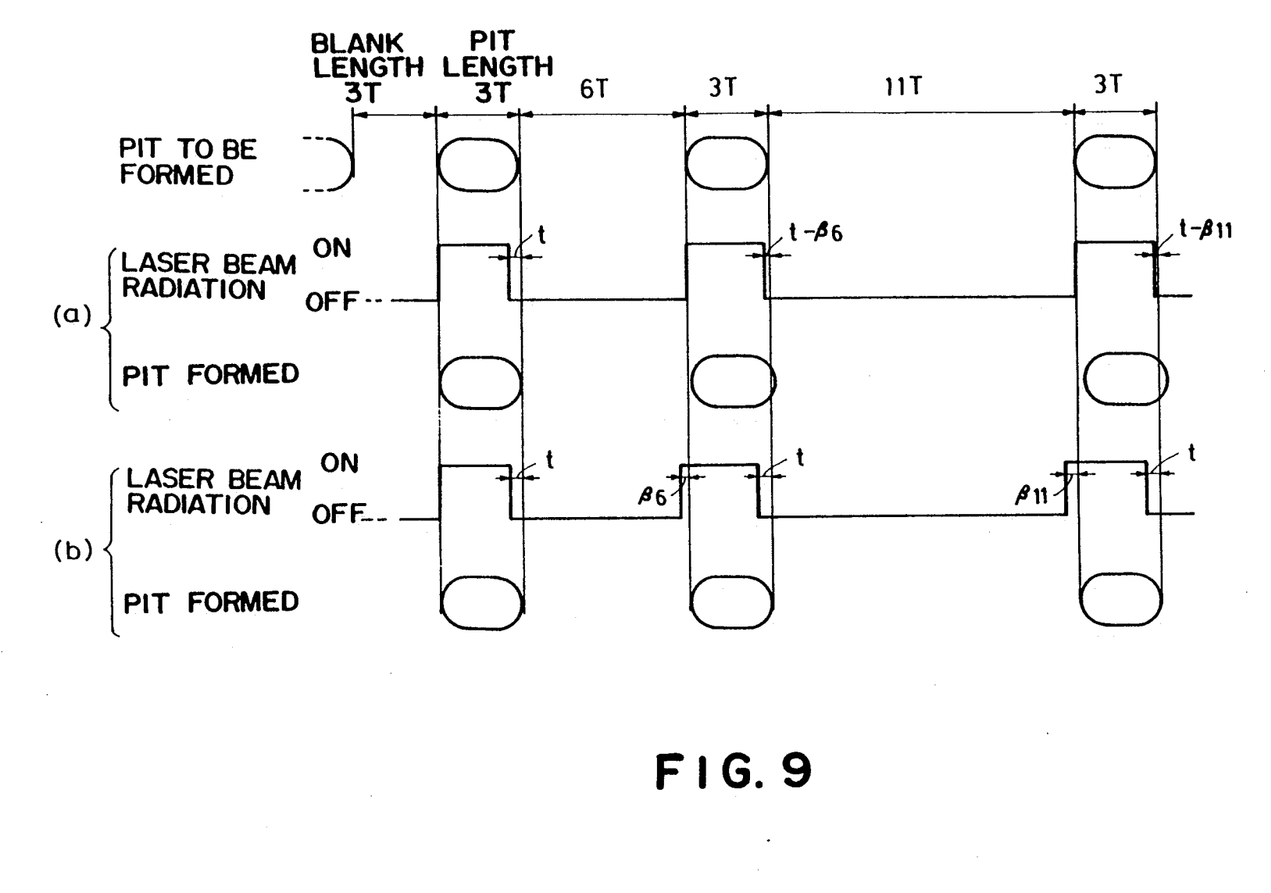
FIG. 9, consisting of (a) and (b), is a diagram showing an example of recording laser beam according to the invention which has been corrected in radiation time in accordance with immediately preceding blank length.

For this reason, if the correction of radiation time in accordance with immediately preceding blank length described in (2) above is made in a rear portion of the radiation time as shown in (a) of FIG. 9 (i.e., in such a manner that the amount of correction is reduced from the rear portion) while maintaining the radiation start position constant regardless of the immediately preceding blank length, a correct pit length can be obtained but the position of the pit is deviated (i.e., the pit position is deviated increasingly behind with increase in immediately preceding blank length and the amount of deviation of the pit position varies substantially in proportion to immediately preceding blank length) with a result that correct blank length cannot be obtained. Since pit length and blank length have equal data weight for recorded data, such error in the blank length causes error in a reproduced signal.

According to the invention, correction of radiation time in accordance with immediately preceding blank length is performed in a starting end portion of radiation time (i.e., in such a manner that the amount of correction is added to the starting end portion) as shown in (b) of FIG. 9. This arrangement enables a pit to be formed at a correct position whereby a correct blank length can be obtained. In FIG. 9, t0 represents constant time.

(4) Correction of radiation time and timing of starting radiation by combination of pit length and immediately preceding blank length Since, as described before, pit length of a pit to be formed is influenced by pit length and immediately preceding blank length, pit length which is closer to a predetermined value can be obtained by determining amount of correction by combination of pit length and immediately preceding blank length. An example of radiation time obtained by various combinations of pit length and immediately preceding blank length is shown in the following Table 3:

TABLE 3

| Immediately preceding blank length | Pit length of a pit to be formed | Radiation time |
|---|---|---|
| 3T | 3T | $3 \cdot T0 + (t + \gamma_{3,3})$ |
| 4T | 3T | $3 \cdot T0 - (t + \gamma_{4,3})$ |
| . | . | . |
| . | . | . |
| . | . | . |
| 11T | 3T | $3 \cdot T0 - (t + \gamma_{11,3})$ |
| 3T | 4T | $4 \cdot T0 - (t + \gamma_{3,4})$ |
| 4T | 4T | $4 \cdot T0 - (t + \gamma_{4,4})$ |
| . | . | . |
| . | . | . |
| . | . | . |
| 11T | 4T | $4 \cdot T0 - (t + \gamma_{11,4})$ |
| . | . | . |
| . | . | . |
| . | . | . |
| 3T | 11T | $11 \cdot T0 - (t + \gamma_{3,11})$ |
| 4T | 11T | $11 \cdot T0 - (t + \gamma_{4,11})$ |
| . | . | . |
| . | . | . |
| 11T | 11T | $11 \cdot T0 - (t + \gamma_{11,11})$ | where

T0 = 1/4.3218 MHz
t = 0 to 500 nsec
$\gamma_{m,n}$ = 0 to 100 nsec
(m: blank length, n: pit length,
m, n = 3, 4, ...., 11)

Figure 11:
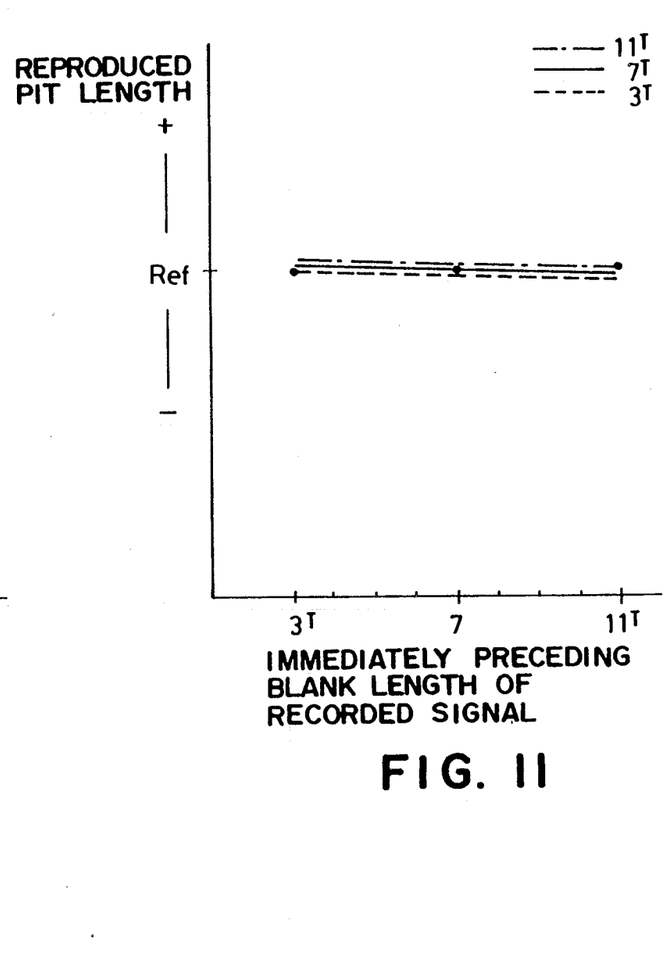
FIG. 11 is a diagram showing deviation of a pit length when radiation time has been corrected in accordance with immediately preceding blank length.

For the same pit length n, $\gamma_{3,n} > \gamma_{4,n} > ... > \gamma_{11,n}$
For the same immediately preceding blank length m,
$\gamma_{m,3} < \gamma_{m,4} < .... < \gamma_{m,11}$ In a case where radiation time $3 \cdot T0 - (t + \gamma_{3,3})$ for immediately preceding blank length 3T and pit length 3T is T3, radiation time $7 \cdot T0 - (t + \gamma_{7,7})$ for immediately preceding blank length 7T and pit length 7T is T7 and radiation time $11 \cdot T0 - (t + \gamma_{11,11})$ for immediately preceding blank length 11T and pit length 11T is T11, the radiation time was corrected in accordance with immediately preceding blank length as shown in Table 4. Deviation of center positions of pit lengths in this case were as shown in FIG. 11. From this figure, it will be understood that deviation of pit length is reduced as compared with the case of FIG. 10 where no correction of radiation time in accordance with immediately preceding blank length is made.

TABLE 4

| Immediately preceding blank length | Pit length of a pit to be formed | Radiation time |
|---|---|---|
| 3T | 3T | T3 |
| 7T | 3T | T3 + 20 nsec |
| 11T | 3T | T3 + 40 nsec |
| 3T | 7T | T7 − 20 nsec |
| 7T | 7T | T7 |
| 11T | 7T | T7 + 20 nsec |
| 3T | 11T | T11 − 40 nsec |
| 7T | 11T | T11 − 20 nsec |
| 11T | 11T | T11 |

If, in this case also, correction of radiation time in accordance with immediately preceding blank length is made in the starting end portion of radiation time (i.e., the amount of correction is added to the starting end portion), a pit can be formed at a predetermined position so that a correct blank length can also be obtained.

The description of the foregoing embodiment has been made with respect to a case where the invention has been applied to a disc in which linear velocity is constant. The invention can also be applied to a disc in which revolution velocity is constant.

In the foregoing embodiment, description has been made about a case where radiation power is constant. The invention can also be applied to a case where a control for varying radiation power is performed in accordance with pit length and immediate blank length.

What is claimed is:

1. An optical disc recording device of the mark length recording tape which records data by forming pits of variable length on an optical disc, each pit having a length of a predetermined number of units of fixed length, comprising:
   laser beam means for providing a laser beam for irradiating an optical disc to form pits; and
   laser beam control means for controlling the radiation timing of the laser beam for each pit to be formed, the control means shortening the radiation time of the laser beam per unit of the pit as the length of a blank portion immediately preceding the pit decreases thereby to form pits of accurate length.

2. An optical disc recording device of the mark length recording type which records data for forming pits of variable length on an optical disc separated by blanks of variable length, each pit and blank having a length of a predetermined number of units, comprising:
   laser beam means for providing a laser beam for irradiating an optical disc to form pits; and
   laser beam control means for controlling the radiation timing of the laser beam for each pit to be formed, the control means advancing the relative starting time of the laser beam for a pit as the length of a blank immediately preceding the pit decreases, thereby to form pits of accurate position and blanks of accurate length.

3. An optical disc recording device of the mark length recording type which records data by forming pits of variable length on an optical disc, each pit having a length of a predetermined number of units of fixed length, comprising:
   laser beam means for providing a laser beam for irradiating an optical disc to form pits; and
   laser beam control means for controlling the radiation timing of the laser beam for each pit, the control means varying radiation time per unit for each pit as a function of both the length of a pit and the length of a blank immediately preceding a pit, thereby to form pits of accurate length.

4. An optical disc recording device as in claim 3 wherein the laser beam control means further varies the relative starting timing of the laser beam for a pit as a function of the length of a blank immediately preceding the pit, thereby to form pits of accurate position and blanks of accurate length.

* * * * *